(12) United States Patent
Loughrin et al.

(10) Patent No.: US 7,314,416 B2
(45) Date of Patent: Jan. 1, 2008

(54) DRIVE SHAFT COUPLING

(75) Inventors: Terry Loughrin, Bolingbrook, IL (US); John Zubik, Lockport, IL (US); Wilhelm Schott, Köln (DE)

(73) Assignee: GKN Walterscheid GmbH (DE)

( * ) Notice: Subject to any disclaimer, the term of this patent is extended or adjusted under 35 U.S.C. 154(b) by 928 days.

(21) Appl. No.: 09/943,685

(22) Filed: Aug. 30, 2001

(65) Prior Publication Data

US 2003/0045366 A1    Mar. 6, 2003

(51) Int. Cl.
    *F16C 3/00*    (2006.01)
(52) U.S. Cl. ............... 464/182; 464/160; 464/161
(58) Field of Classification Search ........... 464/182, 464/160, 163; 403/361, 298, 359.1, 359.6; 172/439, 272
    See application file for complete search history.

(56) References Cited

U.S. PATENT DOCUMENTS

| | | | | |
|---|---|---|---|---|
| 4,069,885 A | * | 1/1978 | Gego et al. | 172/439 |
| 4,551,115 A | * | 11/1985 | Ferguson | 464/160 |
| 4,693,136 A | * | 9/1987 | Clerc et al. | 74/492 |
| 5,672,111 A | * | 9/1997 | Schremmer et al. | 403/359.6 |
| 5,706,901 A | * | 1/1998 | Walters et al. | 172/439 |
| 5,827,122 A | * | 10/1998 | Kurian | 403/359.6 |
| 5,980,389 A | * | 11/1999 | Nienhaus | 464/172 |
| 6,119,789 A | * | 9/2000 | Taylor | 172/439 |
| 6,283,867 B1 | * | 9/2001 | Aota et al. | 464/158 |
| 6,527,643 B2 | * | 3/2003 | Edi | 464/160 |

* cited by examiner

*Primary Examiner*—Aaron Dunwoody
(74) *Attorney, Agent, or Firm*—Harness, Dickey & Pierce, P.L.C.

(57) ABSTRACT

A drive shaft assembly to interconnect a driving component and a driven component has a first shaft and a second shaft operably engaged with the first shaft to enable torque transmission and relative axial sliding motion. A joint component operably interconnects one of the first and second shafts to one of the driving and/or driven components. The joint component is rotatable through a specified range of rotation, or "free-motion". The joint component is axially fixed relative to one of the second shaft, driving component and/or the driven component.

11 Claims, 7 Drawing Sheets

A - A

B - B

DRIVE SHAFT COUPLING

FIELD AND BACKGROUND OF THE INVENTION

The invention is directed toward a drive shaft coupling including a rotational range of "free-motion" for interconnecting a driving component and a driven component.

In many instances, a driving component is required to be operably interconnected with a driven component for driving communication. Further, the interconnection must enable a degree of relative motion between the driving and the driven components. For example, in many agricultural operations a tractor is used to tow a secondary agricultural implement. Also, the tractor operably drives the secondary agricultural implement. To achieve this, the tractor typically includes an output shaft (i.e. a driving component) operably interconnected to an input shaft (i.e. driven component) of the secondary agricultural implement. The interconnection is typically achieved by a drive shaft disposed between the components.

In almost all instances, the tractor is used for a variety of tasks. Accordingly, various types of secondary agricultural implements must be readily engageable with the tractor. Thus, connection and disconnection of the drive shaft assembly is required. Often, the output shaft of the tractor and the input shaft of the secondary agricultural implement are not sufficiently aligned and thus prohibit quick interconnection therebetween. Thus, it is desirable to provide a drive shaft assembly that includes a range of rotational motion, or "free-motion" to enable interconnection between the input and output shafts when they are out of exact rotational alignment.

To this end, it is known in the art to provide a telescoping drive shaft assembly including a rotational range of "free-motion" along the telescopic interconnection. Such a drive shaft assembly is illustrated in U.S. Pat. Nos. 5,827,122 and 5,938,534, assigned to Neapco, Inc. The patents each provide a drive shaft assembly, which includes telescopically interconnectable first and second drive shaft halves. The telescopic interconnection further includes a tooth/groove arrangement. The arrangement enables a range of relative rotation between the first and second halves. Also, the arrangement concurrently provides relative axial motion.

The prior art methods detailed above retain certain disadvantages. Specifically, the telescoping interconnection of the drive shaft assembly preferably includes first and second shafts each having a lemon-shaped cross-section including a generally circular shape with diametrically opposed extended portions or ribs. In this manner, the ribs fix the first and second shafts for common rotation while enabling relative axial plunging. Such a cross-section, while preferable due to reduced manufacturing costs, is unable to properly function when including a "free-motion" function. A further disadvantage of the prior art methods is that the possibility does not exist to separate the telescoping and rotational functions. Such separation may be desirable for particular applications.

SUMMARY OF THE INVENTION

Accordingly, the present invention provides a drive shaft assembly to interconnect a driving component and a driven component. The drive shaft assembly includes a first shaft and a second shaft. The second shaft engages the first shaft to enable torque transmission and relative axial sliding motion. A joint component operably interconnects one of the first and second shafts to one of the driving and driven components. The joint component is both rotatable, through a specified range of rotation, and is fixed from axial movement relative to one of the second shaft, the driving component and the driven component.

In this manner, the present invention segregates the plunging and "free-motion" functions to separate components of the drive shaft assembly. As such, alternative cross-sections, such as a lemon-shaped cross-section, are usable for enabling plunging of the drive shaft. A significant advantage of this is that such alternative cross-sections are less expensive to produce as a result of centering on the ribs. Further, separation of the plunging and "free-motion" functions enables any kind of plunging components known in the art to be implemented. Additionally, the "free-motion" function has no kinematic effect on the plunging function.

From the following detailed description, taken in conjunction with the drawings and subjoined claims, other objects and advantages of the present invention will become apparent to those skilled in the art.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
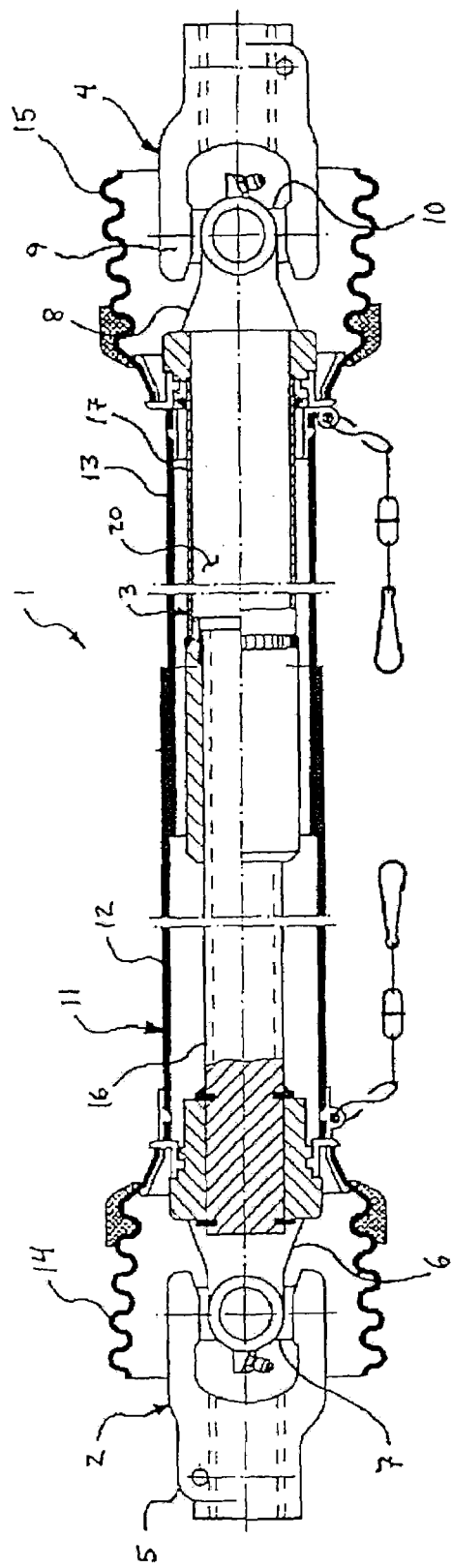
FIG. 1 is a partial cross sectional view of a drive shaft assembly in accordance with the principles of the present invention.

With reference to the figures, a drive shaft assembly 1 is shown. The drive shaft assembly 1 generally includes a first universal joint assembly 2, a telescoping shaft assembly 3 and a second universal joint assembly 4. The first universal joint assembly 2 includes first and second universal joint yokes 5,6 operably interconnected by a first cross or spider 7. Similarly, the second universal joint assembly 4 includes third and fourth universal joint yokes 8,9 operably interconnected by a second cross or spider 10. Generally, the first and second universal joints 2,4 enable the drive shaft assembly 1 to be somewhat articulable for interconnecting a driving component (not shown) and a driven component (not shown) that require a degree of independent movement therebetween. Although the present embodiment describes first and second universal joints 2,4, it will be appreciated that the first and second universal joints 2,4 may be substituted for other joint types known in the art, such as constant velocity joints.

A protective cover 11 is further provided and completely surrounds the drive shaft assembly 1. The protective cover 11 includes first and second tubes 12, 13 telescopically engaged with one another. A first flexible cover 14 is disposed about the first universal joint 2. A second flexible cover 15 is disposed about the second universal joint 4. The first flexible cover 14 is attachable to either the driven or the driving component. The second flexible cover 15 is attachable to the other of the driven and the driving component. In this manner, the protective cover 11 is fixed from rotation relative to the driven and driving components. The drive shaft assembly 1 rotates within the protective cover.

Figure 4:
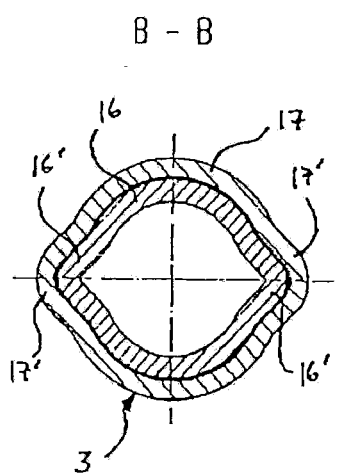
FIG. 4 is a cross sectional view of a shaft assembly portion along the line B-B of FIG. 2.

The telescoping shaft assembly 3 includes a first shaft 16 slidably disposed within a second shaft 17. The first shaft 16 is operably interconnected with the second yoke 6 of the first universal joint 2. The second shaft 17 is interconnected with the third yoke 8 of the second universal joint 4. As best seen in FIG. 4, the first and second shafts 16,17 each include a cross-section having a circular shape with diametrically opposed extended portions or ribs 16',17', respectively. The first and second shafts 16,17 slidably engage one another with the first shaft sliding into a bore 20 of the second shaft 17, whereby the ribs 16' slidingly engage the ribs 17'. In this manner, the first and second shafts 16,17 are fixed for rotational motion with one another. The first and second shafts 16, 17 enable relative axial motion, or plunging, along a longitudinal axis X. This cross-section, which enables the plunging interconnection, is preferable since it is a less expensive option to produce the first and second drive shafts 16,17 than prior art methods, which include sliding spline engagements.

Although the present invention describes a rib interconnection to provide a telescoping function, it is anticipated that a spline engagement between the first and second shafts 16,17 may be optionally implemented to provide this function.

Figure 2:
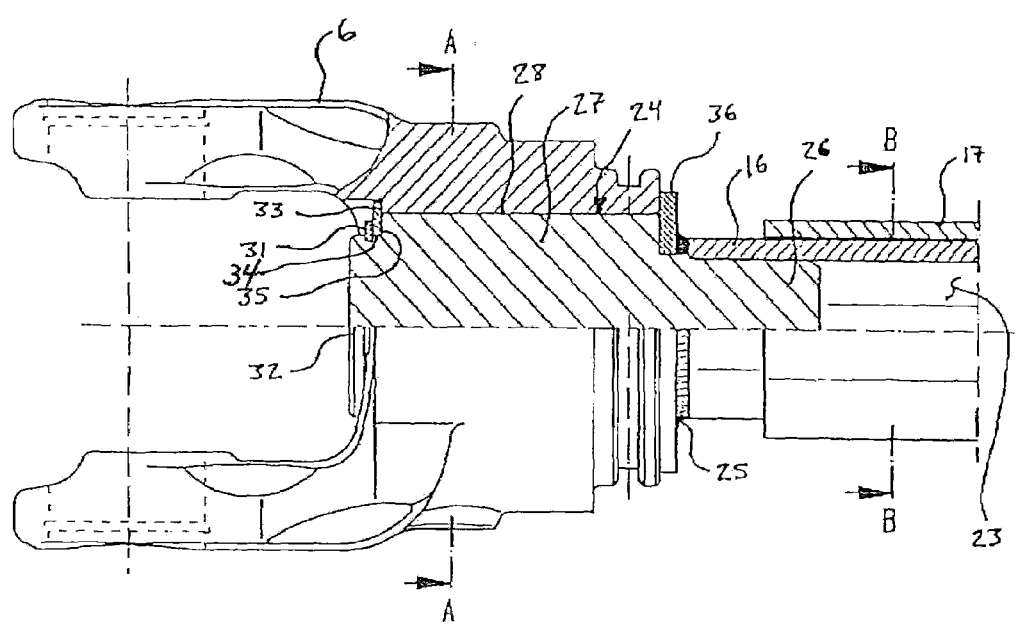
FIG. 2 is a partial cross sectional view of a universal joint component coupled to a shaft of the drive shaft assembly in accordance with a first preferred embodiment of the present invention.
Figure 3:
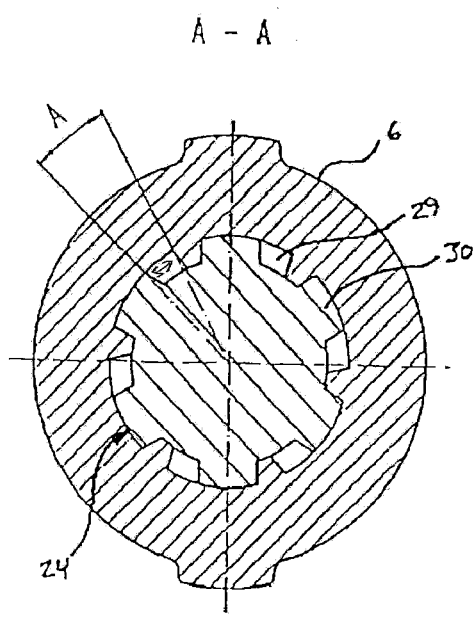
FIG. 3 is a cross sectional view of the universal joint and shaft engagement along the line A-A of FIG. 2.

With particular reference to FIGS. 2 and 3, a first preferred embodiment of the interconnection between the first shaft 16 and the first universal joint 2 will be described in detail. In accordance with the first preferred embodiment, the first shaft 16 is provided as a tube having a bore 23. A stub shaft 24 interconnects the first shaft 16 and the second yoke 6. A weld 25 is included to fixedly interconnect the stub shaft 24 and the first shaft 16. The stub shaft 24 includes a first end 26. The first end 26 has a reduced diameter which is disposed within the bore 23 of the first shaft 16. A second end 27 of the shaft 24, which has a larger diameter, is operably disposed within a bore 28 of the second yoke 6.

The bore 28 of the second yoke 6 includes a series of axially running grooves 29 and the second end 27 of the stub shaft 24 includes a series of radially extending, axial teeth 30. The second end 27 of the stub shaft 24 is received into the bore 28 of the second yoke 6. The teeth 30, respectively, align with the grooves 29. As best seen in FIG. 3, the grooves 29 are generally of a larger width than the width of the teeth 30. As a result, a range of relative rotational motion, or "free-motion" is provided between the second yoke 6 and the stub shaft 24. The amount of "free-motion" is provided as the angle A.

Although the second yoke 6 and stub shaft 24 are able to rotate relative to one another, within the provided range, they are fixed from relative axial motion. Accordingly, a first ring 31 is disposed about an end 32 of the stub shaft 24. A second ring 33 is disposed within a groove 34 of the stub shaft 24 to hold the first ring 31 against a face 35 of the stub shaft 24. In this manner, the second yoke 6 is fixed from axial movement between the first ring 31 and a washer 36 disposed about the first shaft 16.

Figure 5:
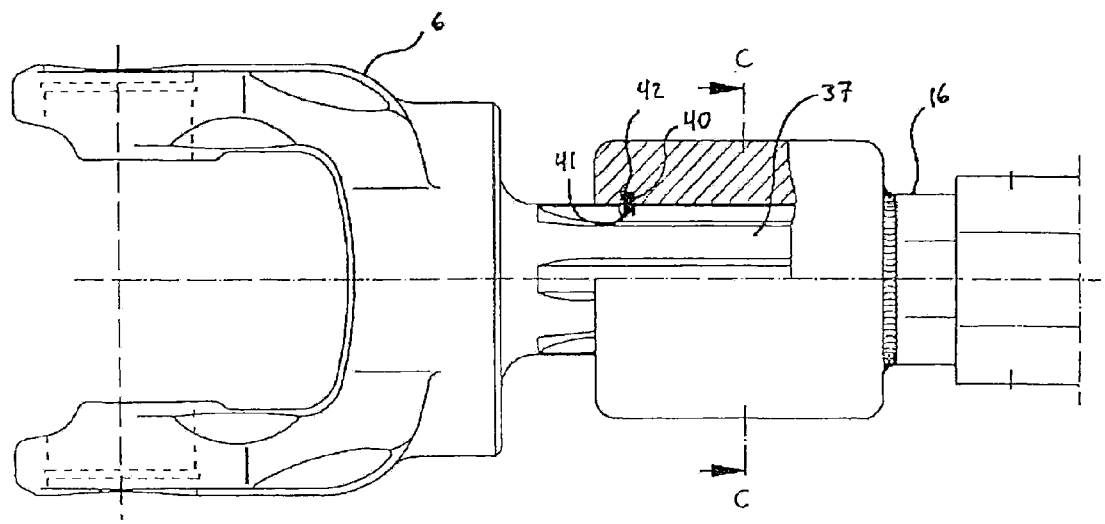
FIG. 5 is a partial cross sectional view of the universal joint component coupled to the shaft in accordance with a second preferred embodiment of the present invention.
Figure 6:
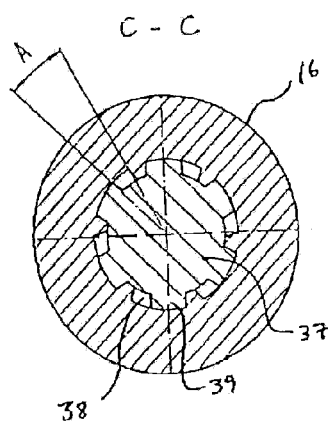
FIG. 6 is a cross sectional view of the universal joint and shaft engagement along the line C-C of FIG. 5.

With particular reference to FIGS. 5 and 6, a second preferred embodiment of the interconnection between the first shaft 16 and the first universal joint 2 will be described in detail. In accordance with the second preferred embodiment, the second yoke 6 of the first universal joint 2 includes a stub end 37. The stub end 37 is received into the bore 20 of the first shaft 16. The bore 20 of the first shaft 16 includes a series of axially running grooves 38. The stub end 37 of the second yoke 6 includes a series of radially extending, axial teeth 39. The stub end 37 is received into the bore 20 of the first shaft 16. The teeth 39 respectively align with the grooves 38. As best seen in FIG. 5, the grooves 38 are generally of a larger width than the width of the teeth 39. As a result, a range of relative rotational motion, or "free-motion", is provided between the second yoke 6 and the first shaft 16. The amount of "free-motion" is provided as the angle A.

Again, the second yoke 6 and the first shaft 16 are fixed from relative axial motion. Accordingly, a ring 40 is disposed within a groove 41 of the stub end 37 and a groove 42 of the first shaft 16. The ring 40 seats within the grooves 41,42 to sufficiently interconnect the stub end 27 and the first shaft 16. Disconnection of the stub end 27 and the first shaft may only be realized through the application of a high axial load. Disconnection is achieved when the load is applied beyond maximum telescoping action of the telescoping shaft assembly 3.

Figure 7:
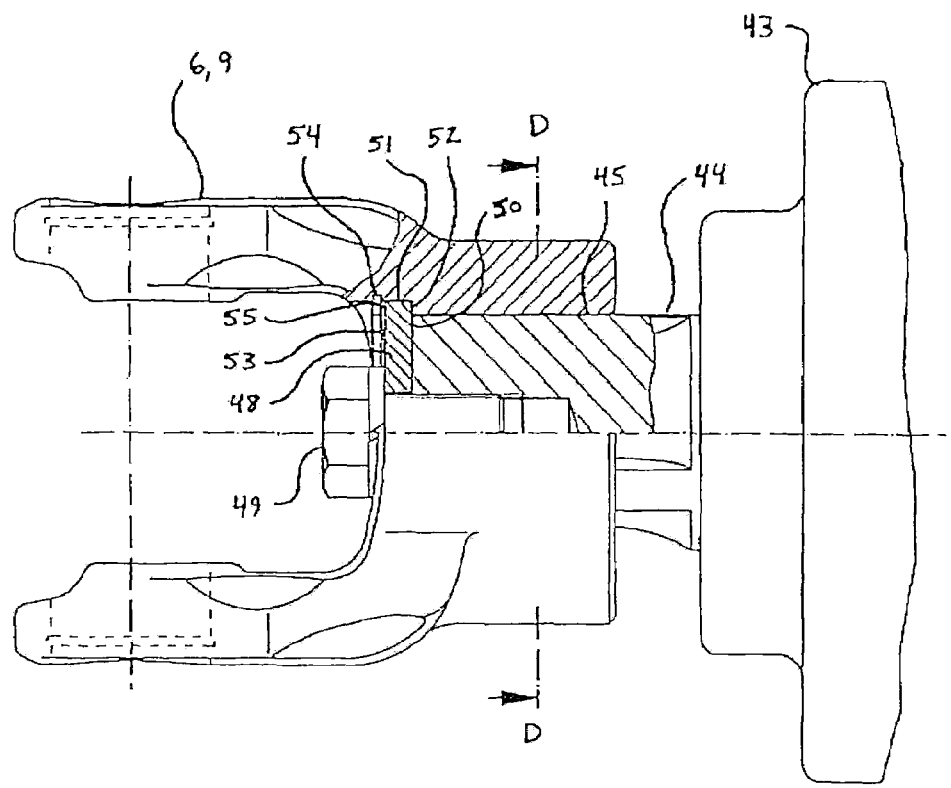
FIG. 7 is a partial cross sectional view of a universal joint component coupled to a shaft of an external driven or driving component.
Figure 8:
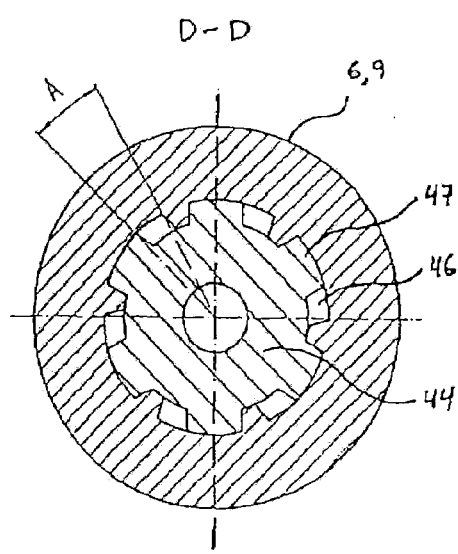
FIG. 8 is a cross sectional view of the universal joint and shaft engagement along the line D-D of FIG. 7.

It is further anticipated that the "free-motion" interconnection can be provided at any one of several locations along the drive shaft assembly 1, as the drive shaft assembly 1 interconnects the driving and driven components. With particular reference to FIGS. 7 and 8, the "free-motion" interconnection is included between one of the first and second universal joints 2,4 and one of the driving or driven components. More specifically, the yoke depicted in FIG. 7 is either the second yoke 6 of the first universal joint 2 or the fourth yoke 9 of the second universal joint 4. Further depicted is a stub shaft 44 which extends from and operably interconnects with a component 43. The component 43 is either the driving component or the driven component. The yoke 6,9 includes a bore 45 with a series of axially running grooves 46. The stub shaft 44 includes a series of radially extending, axial teeth 47. The stub shaft 44 is received into the bore 45 of the yoke 6,9. The teeth 47 respectively align with the grooves 46. As best seen in FIG. 8, the grooves 46 are generally of a larger width than the width of the teeth 47. As a result, a range of relative rotational motion, or "free-motion" is provided between the yoke 6,9 and the stub shaft 44. The amount of "free-motion" is provided as the angle A.

Similarly as described above, the yoke 6,9 and the stub shaft 44 are fixed from relative axial movement. Accordingly, a washer 48 and bolt 49 are provided. The washer 48 is bolted against an end face 50 of the stub shaft 44 by the bolt 49. The washer 48 is of a larger diameter than the stub shaft 44. The washer 48 seats within a recess 51 of the bore 45 of the yoke 6,8, against a first stop face 52. A stop ring 53 seats within a groove 54 of the bore 45. The stop ring 53 provides a second stop face 55. Thus, the washer 48 is fixed from axial movement between the first and second stop faces 52,55. This prohibits axial movement of the yoke 6,8 relative to the stub shaft 44.

Figure 9:
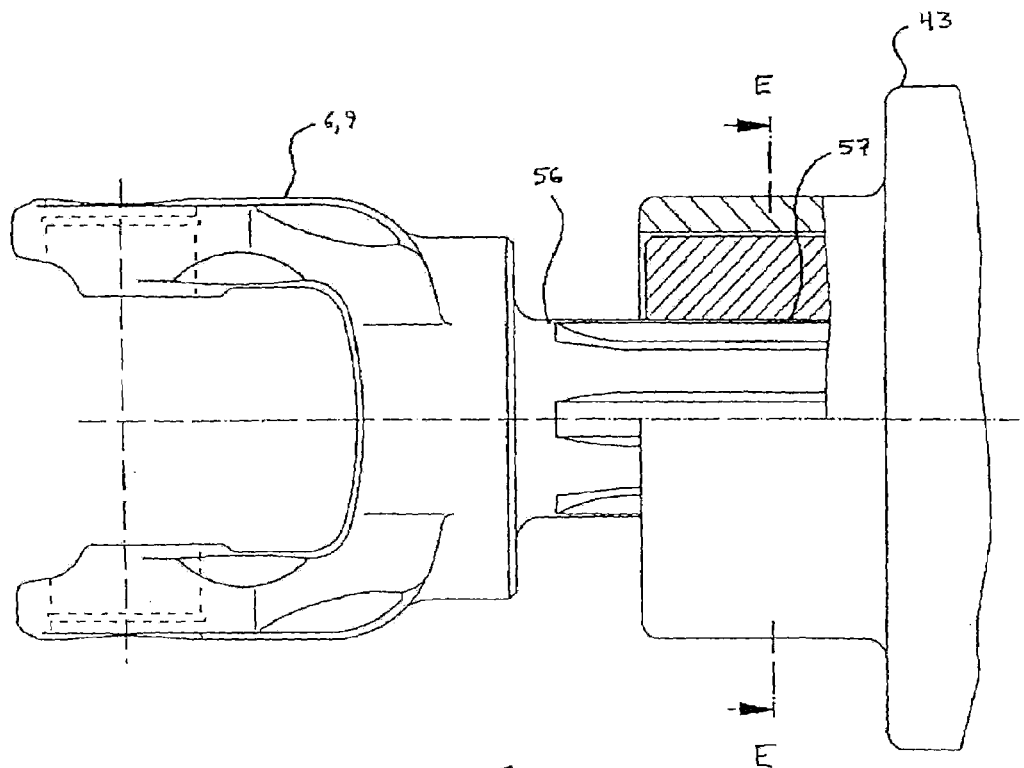
FIG. 9 is a partial cross sectional view of an alternative embodiment of a universal joint coupled to an external driven or driving component.
Figure 10:
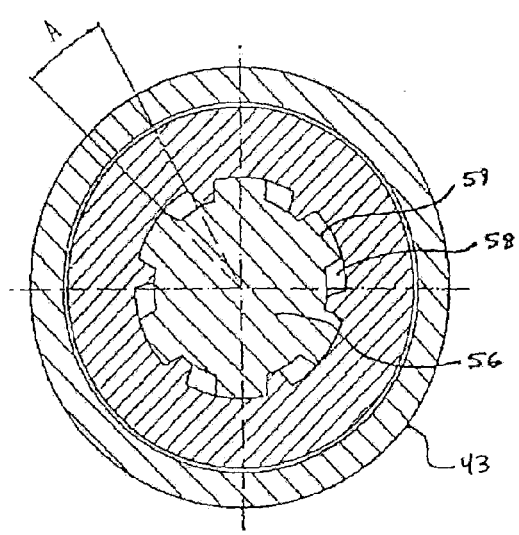
FIG. 10 is a cross sectional view of the universal joint engagement along the line E-E of FIG. 9.
Figure 11:
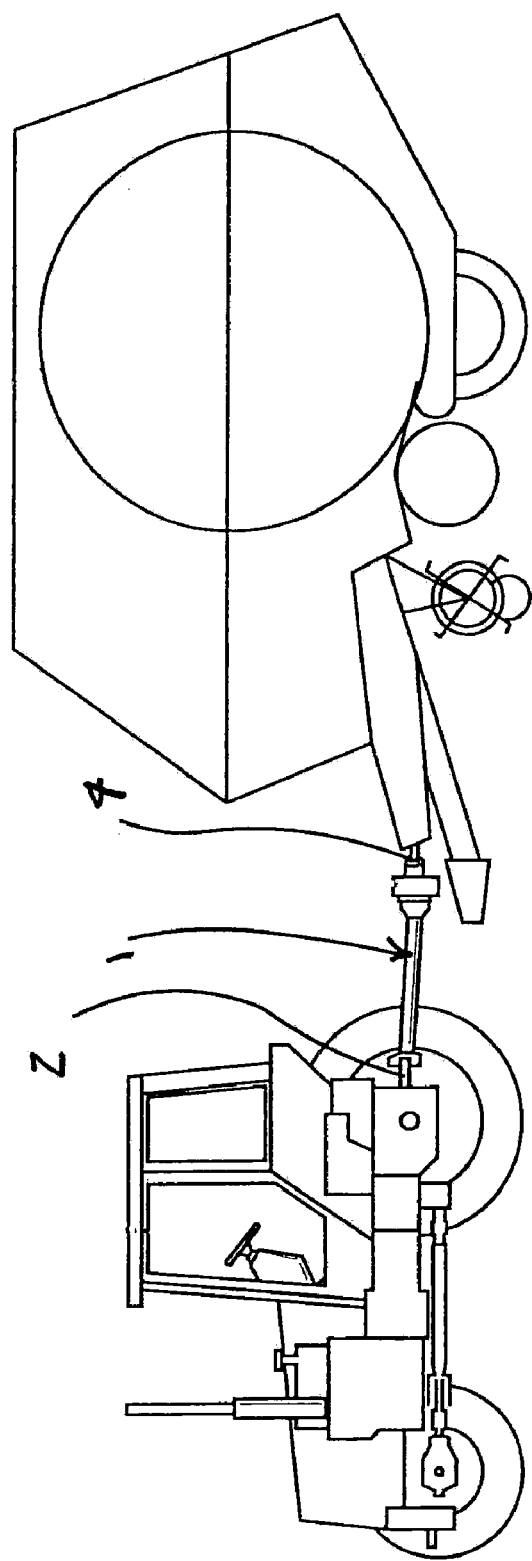
FIG. 11 is a schematic view of a tractor and agricultural implement.

An alternative embodiment of the "free-motion" interconnection between one of the first and second universal joints 2,4 and one of the driving or driven components is depicted in FIGS. 9 and 10. The yoke 6,9 includes a stub end 56 extending from and operably interconnected with the component 43. The component 43 includes a bore 57. The bore 57 has a series of axially running grooves 58. The stub end 56 includes a series of radially extending, axial teeth 59. The stub end 56 is received into the bore 57. The teeth 59 respectively align with the grooves 58. As best seen in FIG. 10, the grooves 58 are generally of a larger width than the width of the teeth 59. As a result, a range of relative rotational motion, or "free-motion" is provided between the stub end 56 and the component 43. The amount of "free-motion" is provided as the angle A.

It should also be noted that the "free-motion" mechanism of the present invention may include a varying number of teeth and groove combinations. For example, as depicted in the Figures six teeth/grooves are implemented. However, this number may vary as a design may require.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive shaft assembly for interconnecting a driving component of an agricultural machine and a driven component of an agricultural implement, comprising:
    a first shaft;
    a second shaft engaging said first shaft for enabling torque transmission without relative rotational movement and enabling relative axial sliding motion therebetween; and
    a joint component of a universal joint operably interconnecting one of said first and second shafts to one of the agricultural driving and driven components, said joint component is both rotatable through a specified range of free-motion rotation without torque transmission and is fixed from axial movement relative to one of said second shaft, the agricultural driving component of the agricultural machine and the agricultural driven component of the agricultural implement.

2. The drive shaft assembly of claim 1, wherein said joint component includes axial grooves and said second shaft includes an end portion having radially extending axial teeth for engaging said grooves and thereby enabling said specified range of relative rotation.

3. The drive shaft assembly of claim 2, wherein said grooves are formed within a bore of said joint component and said teeth extend outward from said end portion, whereby said end portion is received into said bore for enabling engagement between said teeth and said grooves.

4. The drive shaft assembly of claim 2, wherein said grooves are formed in an outer circumferential surface of said joint component and said teeth extend radially inward from said end portion, whereby said joint component is partially received into said end portion for enabling engagement between said teeth and said grooves.

5. The drive shaft assembly of claim 2, further comprising a ring engaged with a ring groove of one of said joint component and said second shaft for fixing said joint component and said second shaft from relative axial motion therebetween.

6. The drive shaft assembly of claim 1, wherein said joint component includes axial grooves and one of the driving and driven components includes radially extending axial teeth for engaging said grooves and thereby enabling said specified range of relative rotation.

7. The drive shaft assembly of claim 6, wherein said grooves are formed within a bore of said joint component and said teeth extend radially outward from one of the driven and driving components, whereby one of said driven and driving components is received into said bore for enabling engagement between said teeth and said grooves.

8. The drive shaft assembly of claim 6, wherein said grooves are formed along a stub end of said joint component and said teeth extend radially inward within a bore of one of the driven and driving components, whereby said stub end is partially received into said bore for enabling engagement between said teeth and said grooves.

9. The drive shaft assembly of claim 6, further comprising a ring engaged with a groove of one of said joint component, the driven component and the driving component for fixing said joint component and one of the driven component and driving component from relative axial movement therebetween.

10. The drive shaft assembly of claim 1, wherein said joint component is a universal joint yoke.

11. The drive shaft assembly of claim 1, wherein said second shaft includes a stub end interconnected thereto for operably interconnecting said joint component and said second shaft.

* * * * *